INFRARED RADIATION AMPLIFIER

Filed Dec. 21, 1959 2 Sheets-Sheet 1

INVENTOR.
NATHAN SCLAR

BY Karl Huber
James E. Bryan
Alan C. Rose
ATTORNEYS

INVENTOR.
NATHAN SCLAR
BY Karl Huber
James E. Bryan
Alan C. Rose
ATTORNEYS 3,062,959
Patented Nov. 6, 1962

3,062,959

INFRARED RADIATION AMPLIFIER

Nathan Sclar, Glen Rock, N.J., assignor to Nuclear Corporation of America, Denville, N.J., a corporation of Delaware Filed Dec. 21, 1959, Ser. No. 861,088
16 Claims. (Cl. 250—83.3)

Figures 1, 2, 3, 4:
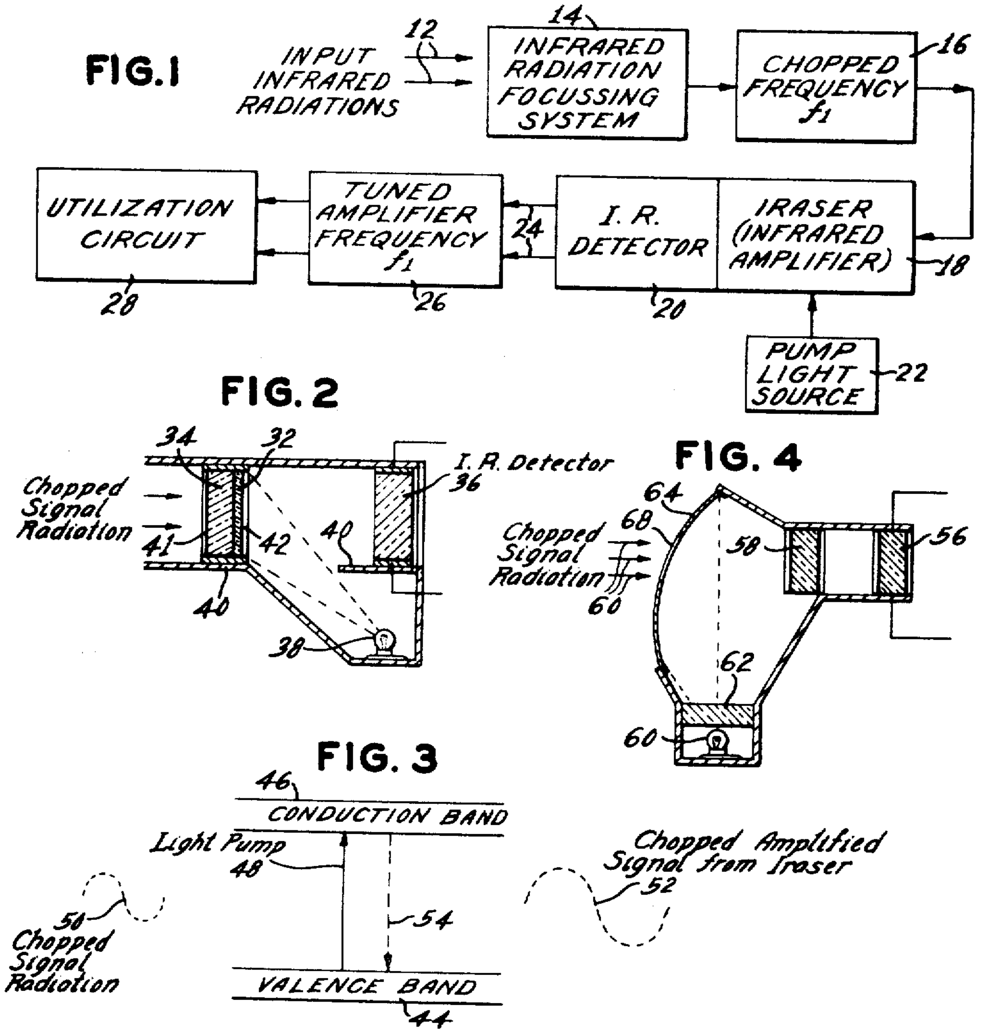

The present invention relates to amplifiers for infrared radiation.

In the microwave field, a recent development has been a form of amplifier known as the "Maser." The name "Maser" stands for "Microwave Amplification by Stimulated Emission of Radiation." In the maser, a material, usually a gas or a crystal, is employed which has a number of discrete energy levels. One of the energy transitions between levels must have an energy difference corresponding to the frequency at which amplification is to take place. A "pump" source of high frequency energy is employed to increase the concentration of electrons in an energy level above the desired transition. Input signals applied to the system will then trigger transitions, and the resulting output signal will exceed the input signal and thereby produce amplification.

Masers have been proposed which employ the same two levels both for the pump input and the signal output. These are known as two-level masers. Alternatively, it is possible to produce output signals from a transition between two levels, one of which is intermediate to the levels between which the pump operates. This is a three-level maser. Difficulties in extracting the signal in the two-level case, have led to a preference for the three-level maser for microwave amplification.

For the maser, efficient operation requires liquid helium temperatures (within 5° K. of absolute zero), and a magnet is needed to establish the energy levels. The maser is characterized by a very narrow frequency response with a high Q, giving sharp tuning but narrow bandwidth capabilities.

Up to the present time, the principles of maser operation have not been considered to be promising for infrared radiation amplification. This is, in part, a result of the sharp tuning which is characteristic of maser operation, and the broader frequency response band required of infrared radiation amplification devices. However, in accordance with the present invention, it has been determined that broader band response may be obtained by the use of transitions between the conduction and valence bands of certain materials or between one of these bands and intermediate energy levels. The significant width of the conduction and valence bands provides a relatively broad bandwidth for amplification. Such infrared amplifiers have been termed "Irasers," a name derived by the substitution of the letters "*ir*" for infrared in place of the "*m*" for microwave, in the word "maser."

In accordance with one illustrative embodiment of the invention, a three-level iraser is provided with a gold doped n-type germanium infrared detector and another gold doped n-type crystal of substantially the same composition as the detector. Both of the two crystals are maintained at about liquid nitrogen temperature, in the vicinity of −196° C. The presence of the gold provides an energy level near the conduction band and between the conduction and the valence bands of the germanium crystal. The infrared frequency band corresponding to the transition between the energy level provided by the gold and the conduction band, corresponds closely to the frequency bandwidth of a "window" in the spectral absorption characteristic of the earth's atmosphere. In order to increase the concentration of electrons in the conduction band, an auxiliary neon or tungsten light pump is directed toward the amplification crystal. Under these conditions, the equilibrium concentration of electrons in the conduction band is increased. Upon the application of infrared input signals, having a frequency band corresponding to the transition between the conduction band and the gold energy level, a number of these transitions are triggered, and the incident infrared signals are amplified.

In accordance with a feature of the invention, an infrared amplifier and detector unit includes crystalline infrared photoconductive material having transitions between a broad band energy level and another energy level, and includes arrangements for increasing the electron concentration in the higher of the two energy levels. Furthermore, infrared signals of a frequency band corresponding to the energy transitions between levels noted above are supplied to the crystalline material.

Other objects, features and advantages of the invention will become apparent from a consideration of the following detailed description and the accompanying drawings, in which, FIG. 1 is a block diagram of an infrared system in accordance with the present invention, FIG. 2 is a diagrammatical showing of a two-level iraser.

Figure 5:
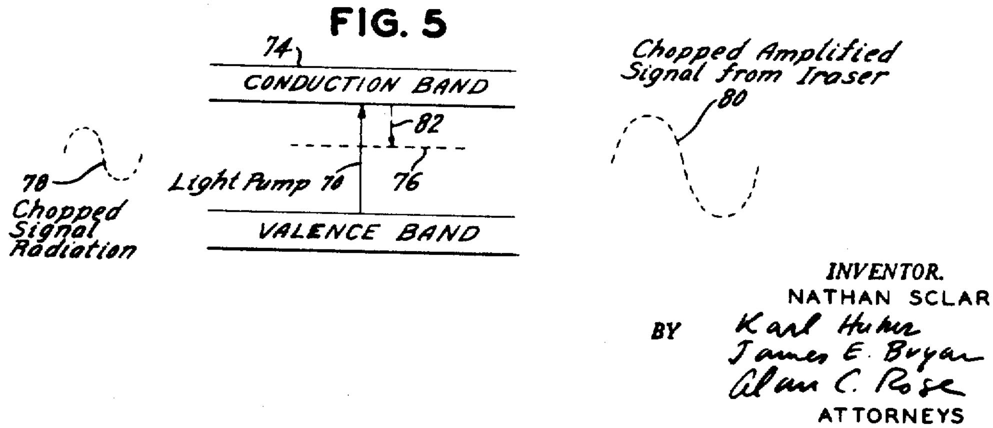
Figure 6:
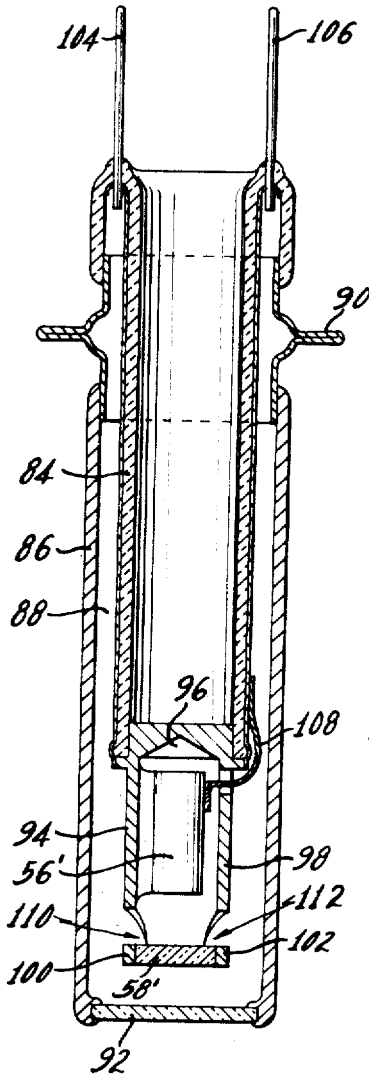
Figure 7:
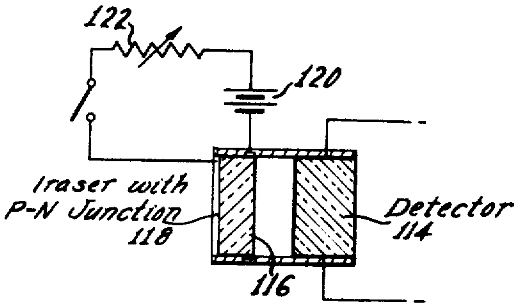
Figure 8:
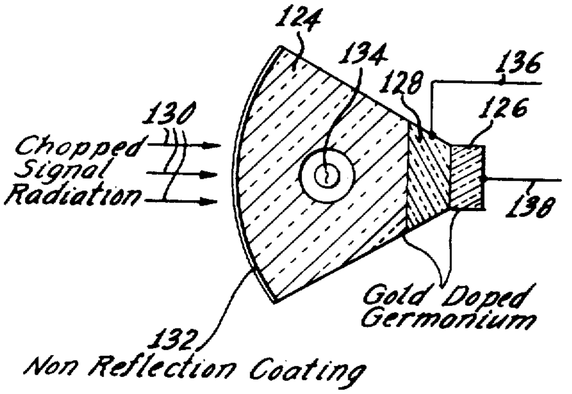

FIG. 3 shows schematically the energy levels and the transitions causing amplification in the arrangement of FIG. 2, FIG. 4 is a schematic showing of a three-level iraser in accordance with the invention, FIG. 5 is an energy diagram for the three-level iraser of FIG. 4, FIG. 6 is a cross sectional view of a physical arrangement for an infrared iraser employing separate amplification and detection crystals, FIG. 7 represents an alternative embodiment of the invention in which carrier injection is employed to increase the electron concentration in the upper energy levels, and FIG. 8 shows an amplification and detection unit including a pump light source combined in a single unitary construction.

With reference to the drawings, FIG. 1 shows in block diagram form a complete infrared system utilizing the iraser, in accordance with the present invention. In FIG. 1, input infrared radiations indicated by the arrows 12 are converged by conventional infrared radiation focusing apparatus 14 and are applied to the "chopper" 16. The mechanical chopping device 16 periodically interrupts the input infrared radiations at a frequency designated $f_1$. The chopper may, for example, take the form of an apertured disc which is rotated at a high rate of speed. By superposing a modulation at a fixed frequency $f_1$ on the input infrared signals, amplification of the output of the detector can be effected with a tuned amplifier. This is advantageous for discriminating against detector bias current and for suppressing noise by controlling the amplifier bandwidth.

From the chopper 16, the infrared signals are applied to the iraser 18 and its associated detector 20. The iraser 18 is provided with an arrangement such as the pump light source 22 for increasing the concentration of electrons in the energy level above the transitions which are utilized in the iraser amplification processes. The electrical output from the detector 20 is coupled by leads 24 to the tuned amplifier 26. This conventional amplifier 26 is tuned to the frequency $f_1$, at which the infrared signals were modulated by the chopper 16. Following amplification, the infrared signals are applied to conventional utilization circuitry 28.

FIG. 2 is a schematic diagram of a two-level iraser. In FIG. 2, a very thin crystal or film 32 is the active element of the infrared amplifier. The crystal or film 32 could, for example, be made of lead sulphide, PbS, lead telluride, PbTe, lead selenide, PbSe, or indium antimonide, InSb. These materials are known as infrared intrinsic photodetectors, and their sensitivity is based on photon-induced transitions between the valence and conduction bands. With the exception of indium antimonide, all of the materials noted above are fabricated by evaporating or chemically depositing films onto another material. Indium antimonide is a single crystal with a p-n junction on its sensitive surface. In the case of the film 32 in FIG. 2, it is formed by deposition on the substrate 34 which may be of quartz, silicon, or other infrared transparent material. To avoid excessive absorption of the infrared radiations, the film 32 is preferably about one micron in thickness. The infrared detector 36 is located to receive infrared radiations from the crystal 32. The detector 36 is made of the same material as the crystal or film 32. A suitable light source 38, such as a neon lamp or a tungsten filament lamp, is located to irradiate the crystal or film 32. A portion of the housing 40 prevents the application of light from the light source 38 to the detector 36. Suitable non-reflective coatings 41 and 42 are provided on the substrate 34 and the crystal or film 32. Such non-reflecting coatings are well known in the art and may, for example, be composed of zinc sulphide.

FIG. 3 shows the energy bands employed in two-level iraser action. The effect of the light pump 38 is to shift electrons from the valence band 44 to the higher energy conduction band 46 as shown in FIG. 3. Such shifts in energy level are indicated by the solid arrow 48. With materials such as those listed above, the time constant for natural or spontaneous return from the conduction to the valence band is moderately long with respect to the frequency of the input signals. The chopped input signal radiation is shown schematically at 50 in FIG. 3, and the amplified output infrared radiation is shown at 52. This amplification is obtained by the triggering of transitions from the conduction to the valence bands by the input signal radiation. The triggered radiations are indicated by the dashed arrow 54 as shown in FIG. 3.

From a slightly different viewpoint, the radiation from the pump light source 38 may be considered to activate or produce hole-electron pairs in the material. These holes and electrons may recombine in a number of ways including (1) non-radiatively by interaction with lattice vibrations, (2) non-radiatively by interaction with free electrons or holes, or (3) radiatively with the emission of light whose frequency corresponds to the energy gap of the semiconductor crystal. To obtain stimulated emission, it is necessary that the probability for radiative recombination be as large as possible.

The three-level iraser, which will now be described in connection with the diagram of FIG. 4, is to be preferred over the two-level iraser principally because of the ease of obtaining output signals and the lack of interference with the pump signals. In FIG. 4, the infrared detector 56 and the active iraser crystal 58 are both made of the same material. This material will generally be different from that employed in the two-level irasers. As in the case of the two-level iraser, non-reflective coatings are employed on the iraser and detector crystals. In three-level iraser action, the light pump causes transitions from the valence to the conduction bands to increase the concentration in the conduction band, just as in the case of the two-level iraser. The radiative transitions, however, normally occur between the conduction band and an intermediate discrete energy level which is provided, or between the intermediate discrete energy level and the valence band. With this difference in pump frequency as compared with the frequency at which amplification takes place, isolation is easier to obtain and the distinctive output signals may be more readily developed.

In FIG. 4, the light pump source 60 may be either a neon lamp or a tungsten filament lamp, for example. The lamp 60 is directed through a thick piece of glass 62 to the pierced spherical reflector 64 which directs illumination from lamp 60 to the crystal 58. The glass 62 has the effect of absorbing the long wavelengths including radiation at the signal frequencies and passing only the shorter wavelength, high energy rays from the lamp 60. As indicated by the arrows 66, chopped signal radiation is applied through the opening 68 in the reflector 64 onto the crystal 58.

FIG. 5 is an energy diagram showing the energy levels and the transitions which are present in the three-level iraser arrangement shown in FIG. 4. As in the case of the two-level iraser, the light pump creates hole-electron pairs and thus provides an energy transition indicated by arrow 70 from the valence band 72 to the conduction band 74.

For convenience, the energy diagram of FIG. 5 will now be considered in terms of a specific material, n-type gold doped germanium. Techniques for forming this material are well known; in brief, it involves adding antimony to germanium and then adding an amount of gold comparable to the antimony doping. With this material, an intermediate energy level 76 is provided which is between the conduction and the valence bands and is close to the conduction band.

As in the case of the two-level iraser, input signals are shown in FIG. 5 by the sine wave 78, and the amplified output signal is indicated by the larger sine wave 80 at the right hand side of FIG. 5. The transition between the conduction band 74 and the energy level 76 corresponds in energy content to the frequency band of the input chopped radiation signal. Similarly, the output signal from crystal 58 is made up of radiations in this same frequency band. With the increased concentration of electrons in the conduction band 74, the input infrared signals stimulate radiative transitions 82 from the conduction band to the level 76 and thus provide amplification.

When n-type gold doped germanium is used, the transition 82 from the conduction band 74 to the gold level 76 is equal to about 0.2 electron volts. The formula relating wavelength to energy is as follows:

$$E=\frac{hc}{L} \qquad (1)$$

where E represents energy, $h$ is Planck's constant, $c$ is the velocity of light, and L is the wavelength. As a practical formula for use, the following form is more convenient:

$$E=\frac{1.24}{L} \qquad (2)$$

where E is the energy in electron volts and L is the wavelength in microns.

In the case of n-type gold doped germanium, the transition 82 is equal to about 0.2 electron volts, and the transition 70 requires at least 0.7 electron volts. The transition of .2 electron volts corresponds to about 5.5 microns. This is at the upper end of the three to five micron "window" of the spectral absorption characteristic of the earth's atmosphere. Other transitions from the conduction band having somewhat higher energy levels and slightly shorter frequencies are also present which provide response through the desired infrared band.

With p-type gold doped germanium instead of n-type gold doped germanium as discussed above, the gold energy level, with reference to FIG. 5, is about .16 electron volts above the valence band. As in the case of the n-type germanium, the light pump increases the electrons in the conduction band. Prior to returning to the valence band, many of the electrons drop to the gold level, near the valence band. With the increased concentration of electrons in this gold level, amplification by stimulation of input infrared radiations at wavelengths roughly corresponding to the .16 electron volt energy gap, may be obtained. One interesting point to note is that this latter transition is from the intermediate level to the broad valence band, whereas when n-type gold doped germanium is employed, the radiative transition is from the broad conduction band to the intermediate level.

FIG. 6 shows an apparatus for operating at liquid nitrogen temperatures. The apparatus of FIG. 6 includes a liquid nitrogen-containing "Dewar" flask having an inner wall 84, an outer wall 86, and an evacuated space 88 between the two walls. A cylindrical metal seal member 90 is employed in fabricating the apparatus to provide the joint between the inner and outer components of the Dewar flask. To facilitate comparison with the three-level iraser of FIG. 4, the detection cell 56' and the iraser crystal 58' are given primed reference numbers corresponding to the unprimed numbers 56 and 58 employed in FIG. 4. An infrared transmitting window 92 is provided at the lower end of the apparatus of FIG. 6 to avoid absorption of input infrared rays. In order to maintain the detection cell 56' and the iraser crystal 58' at the temperature of the liquid nitrogen within the Dewar flask, the metal closure at the bottom of the inner portion of the Dewar flask is extended to form the cylindrical sleeve 94. The member 94 may, for example, be constructed from a cylindrical metal rod having a central hole drilled most of the way through it. Thus the end of the drilled hole is seen at 96 in FIG. 6, and the tube appears at 94, 98, 100 and 102 where it is not cut away for other purposes.

The two terminals 104 and 106 are connected to foils which extend along the outer surface of the inner glass tube 84. The lead 106 is connected by the jumper wire 108 to one side of the detection crystal, and the lead 104 is connected to the other side of the crystal 56' through the metal sleeve 94. One hole through the sleeve 94 permits the passage of jumper wire 108. The tube 94 is also cut away to permit irradiation by suitable pump light sources from the rear along arrows 110 or 112 when such irradiation is considered desirable.

FIG. 7 shows an iraser structure in which hole-electron pairs are produced by an applied potential rather than by a light pump source. Thus, for example, in FIG. 7 the detection crystal 114 is provided with a matched iraser crystal 116. The crystal 116 may be of either n-type or p-type semiconductive material and is provided with a p-n junction 118 at its forward surface. A direct current source 120 is applied across the junction through a resistor 122. The junction may be operated with forward bias to inject minority carriers or preferably back-biased into the zener breakdown region. The hole-electron pairs which are formed permit the increase of the concentration of electrons in the conduction zone and permit stimulated radiative emission in the same manner as that which occurs when the hole-electron pairs are formed by the light pump.

In the arrangement shown in FIG. 8, the iraser crystal and the detector crystal are incorporated into a single semiconductor body. The assembly of FIG. 8 is a three-level iraser and includes two sections 124 and 126 of gold doped germanium and an intermediate section 128 of intrinsic germanium. Chopped signal radiation as indicated by arrows 130 is incident on the non-reflective coating 132 on the curved surface of the germanium material 124. Embedded in the iraser portion 124 of the germanium material is a lamp source 134, which may, for example, be a neon lamp. In the embodiment of FIG. 8, the infrared radiations are focused toward the detector 128 by refraction at the curved surface of the germanium material. As an alternative to the use of the lamp, a p-n junction may be formed in the germanium material 124, which can be actuated in the manner described in the previous paragraph.

As the liquid nitrogen temperatures at which the device of FIG. 8 is operated, the gold doped germanium is highly resistive while the undoped germanium portion 128 has essentially metallic resistance. The detector 126 operates with a front-to-rear geometry, one electrode 136 being connected to the low resistance undoped germanium while the other electrode 138 is in contact with a conducting surface on the rear of the assembly. This geometry enjoys the advantages of increased light gathering power associated with cell immersion, and the compactness and reliability stemming from the use of a single assembly for both iraser and detector action.

With the exception of applicant's novel proposals, the general details of infrared systems have not been considered in the present application, as infrared technology is well developed. In this regard, reference is made to the September 1959 issue of the "Proceedings of the Ire," volume 47, #9, pp. 1413–1700, designated the "Infrared Issue," which provides background material on many phases of infrared work.

It is to be understood that the above described arrangements are illustrative of the application of the principles of the invention. Numerous other arrangements may be devised by those skilled in the art without departing from the spirt and scope of the invention.

What is claimed is:

1. In combination, an infrared detector comprising a first body of semiconductive material, an infrared amplifier comprising a second body of the same type of semiconductive material in radiative proximity to said first body, means for applying input infrared signals of a predetermined frequency band to said second body, said semiconductor material having broad band energy transitions corresponding to the frequency band of said input infrared signals, and pumping means for increasing the concentration of electrons in the upper level associated with said broad band energy transitions.

2. In combination, an infrared detector comprising infrared photoconductive material, an infrared amplifier comprising a second body of the same type of material, means for applying input infrared signals of a predetermined frequency band to said second body, said material having broad band energy transistions corresponding to the frequency band of said input infrared signals, and pumping means for increasing the concentration of electrons in the upper level associated with said broad band energy transitions.

3. In an infrared amplifier and detector, infrared photoconductive material having first and second portions in radiative proximity to each other, said photoconductive material having broad band energy transitions corresponding to a predetermined infrared frequency band, means for applying input infrared signals of said predetermined frequency band to said first portion of said material, a light source embedded in the said first portion of photoconductive material, and connections to the second portion of said semiconductive material.

4. In an infrared amplifier and detector, infrared photoconductive material having first and second portions in radiative proximity to each other, said photoconductive material having broad band energy transitions corresponding to a predetermined infrared frequency band, means for applying input infrared signals of said predetermined frequency band to said first portion of said material, means for directing light toward said first portion to increase the concentration of electrons in the upper energy level associated with said broad band energy transitions, means for shielding the second portion of said photoconductive material from said light source, and connections to the second portion of said semiconductive material.

5. In an infrared amplifier and detector, infrared photoconductive material having first and second portions in radiative proximity to each other, said photoconductive material having broad band energy transitions corresponding to a predetermined infrared frequency band, means for applying input infrared signals of said predetermined frequency band to said first portion of said material, means including a curved reflector for directing light toward said first portion, and connections to the second portion of said semiconductive material.

6. In an infrared amplifier and detector, infrared photoconductive material having first and second portions in radiative proximity to each other, said photoconductive material having broad band energy transitions corresponding to a predetermined infrared frequency band, means for applying input infrared signals of said predetermined frequency band to said first portion of said material, means including a light source having radiations predominately at a frequency above said predetermined frequency band for increasing the concentration of electrons in the upper energy level associated with said broad band energy transitions, and connections to the second portion of said semiconductive material.

7. An infrared amplifier including in combination a material having a transition between two electron energy levels, the energy of transition being of infrared wavelength, a source of infrared radiation to be amplified, pumping means independent of the source for producing up electron transitions in the material, means responsive to the source for triggering down electron transitions of infrared wavelength, and means including infrared detecting means responsive to the triggered down transitions for providing an output.

8. An infrared amplifier as in claim 7 in which one of the energy levels has a broad band.

9. An infrared amplifier as in claim 7 in which the pumping means includes a source of light.

10. An infrared amplifier as in claim 7 in which the material is a semiconductor having a p-n junction and in which the pumping means comprises means for biasing the junction.

11. An infrared amplifier as in claim 7 in which the triggering means includes means for varying the intensity of source radiation at a certain carrier frequency and in which the output means further includes an amplifier tuned to said carrier frequency.

12. An infrared amplifier as in claim 7 in which the material and the infrared detecting means comprise portions of a single crystal.

13. An infrared amplifier including in combination a material having transitions between a high and an intermediate and a low electron energy level, the energy of transition between the intermediate level and a certain one of the other levels being of infrared wavelength, a source of infrared radiation to be amplified, pumping means independent of the source for producing up electron transitions from the low to the high energy level, means responsive to the source for triggering down electron transitions of infrared wavelength, and means including infrared detecting means responsive to the triggered down transitions for providing an output.

14. An infrared amplifier as in claim 13 in which said certain level is the high electron energy level.

15. An infrared amplifier as in claim 13 in which said certain level is the low electron energy level.

16. An infrared amplifier as in claim 13 in which said certain energy level has a broad band.

References Cited in the file of this patent

UNITED STATES PATENTS

| | | |
|---|---|---|
| 2,692,950 | Wallace | Oct. 26, 1954 |
| 2,798,962 | Wormser | July 9, 1957 |
| 2,824,235 | Hahn et al. | Feb. 18, 1958 |
| 2,920,205 | Choyke | Jan. 5, 1960 |